United States Patent [19]
Constantino et al.

[11] Patent Number: 5,407,632
[45] Date of Patent: Apr. 18, 1995

[54] TWIN SHEET THERMFORMED STRUCTURE AND METHOD OF MAKING SAME

[75] Inventors: James P. Constantino, Mt. Clemens; Raymond H. Gosnell, Plymouth, both of Mich.

[73] Assignee: Cadillac Products, Inc., Troy, Mich.

[21] Appl. No.: 134,462

[22] Filed: Oct. 8, 1993

Related U.S. Application Data

[63] Continuation of Ser. No. 877,996, May 4, 1992, abandoned.

[51] Int. Cl.⁶ .............................................. B29C 51/10
[52] U.S. Cl. ...................................... 264/545; 425/388
[58] Field of Search ............... 156/242, 196, 285, 292, 156/309.6, 290; 264/545, 553, 554; 425/388

[56] References Cited

U.S. PATENT DOCUMENTS

| | | | |
|---|---|---|---|
| 2,991,500 | 7/1961 | Hagen | 264/545 |
| 3,444,034 | 5/1969 | Hewett | 264/545 |
| 3,444,034 | 5/1969 | Hewett . | |
| 3,467,741 | 9/1969 | Kesling | 425/388 |
| 3,736,201 | 5/1973 | Teraoka | 264/545 |
| 3,875,280 | 4/1975 | Story | 425/388 |
| 4,016,230 | 4/1977 | Michel | 264/554 |
| 4,261,473 | 4/1981 | Yamada et al. | 264/544 |
| 4,423,000 | 12/1983 | Teraoka | 264/545 |
| 5,051,084 | 9/1991 | Guarriello et al. | 264/527 |

FOREIGN PATENT DOCUMENTS

| | | | |
|---|---|---|---|
| 0376593 | 7/1990 | European Pat. Off. . | |
| 53-51263 | 5/1978 | Japan | 264/545 |
| 53-114868 | 10/1978 | Japan | 264/545 |
| 56-144951 | 11/1981 | Japan | 264/545 |

Primary Examiner—Catherine Timm
Attorney, Agent, or Firm—Harness, Dickey & Pierce

[57] ABSTRACT

In producing a twin sheet thermoformed structure, a mold is provided with major rib producing structures segregrated into discrete tabs with gaps between tabs. A first sheet of material is fused upon itself by drawing the material into the gaps between tabs from both sides of the gap. The material drawn into the gaps fuses upon contact with material being drawn into the gap from the other side forming a cross rib which tends to stabilize the side walls of the major rib. The first sheet is then fused to a second sheet of material to create a twin sheet structure.

5 Claims, 4 Drawing Sheets

TWIN SHEET THERMFORMED STRUCTURE AND METHOD OF MAKING SAME

This is a continuation of United States patent application Ser. No. 077/877,996, filed May 4, 1992, now abandoned.

BACKGROUND AND SUMMARY OF THE INVENTION

This invention relates to a method of making a twin sheet thermoformed structure and the resultant product of that method.

Single sheet thermoforming has been perceived as lacking in strength for some applications. In an attempt to strengthen single sheet structures, designers have fused the single sheet upon itself to create webbing or cross ribbing. The webbing is generally material that crosses a structure in the article, such as a rib, so as to help stabilize the single sheet structure.

Basic apparatus for performing twin sheet thermoforming is shown by way of example in U.S. Pat. Nos. 3,583,036, 3,787,158, and 3,925,140 to Brown. The method of twin sheet thermoforming is well known in the art to produce hollow structures. In its most basic form, twin sheet thermoforming consists of heating two separate sheets of plastic, forming each sheet to a mold, then fusing the two sheets together by bringing the two molded sheets into contact at selected points where fusion will take place. In one form, the molded sheets are fused together by bringing the respective mold for each sheet together so that the sheets on the surface of the molds contact each other. The intended result is an article having greater strength and/or rigidity than the same article formed from a single sheet of plastic.

A considerable amount of development work in the twin sheet thermoforming art has focused on the engineering of beams or ribs in one or both of the twin sheets to increase the strength of the resultant article for any given amount of thermoformed material. The use of channels (e.g., troughs produced by molding bends in the plastic sheets) or bosses (e.g., circular or trapezoidal impressions formed in one or both sheets) are well known in the art for use as rib structures to strengthen or stiffen the twin sheet thermoformed article. The beam structures are formed by molding the thermoplastic material over the surface of a mold so that the thermoformable sheet conforms to the surface structure of the mold. By way of example, if the surface structure of the mold contains a male rib, thermoforming the thermoformable sheet over the mold surface structure will result in a female rib created in the thermoformable sheet. A rib thermoformed in one sheet may create a bending moment or hinge along its axis. To offset this, a non-parallel rib may be thermoformed in the opposing sheet with the two ribs fused together where they intersect. Another design response has been to reduce the length of particular ribs to reduce the propagation of hinge or bending moment effects. The presence of the ribs may, however, contribute to functional problems not relating to strength, e.g., the ribs may collect water and need to be drained. Ribs running the length of an article may also leave the article prone to warpage, as small expansions or contractions in material may be propagated along the entire article causing it to warp.

The continuing work on designing rib structures for twin sheet thermoformed articles indicates the industry's desire to improve the strength developed per amount of raw material (thermoformable material) used. It is an object of the present invention to provide a twin sheet thermoforming technique which improves the strength or rigidity developed per amount of material used. It is a further object to increase the strength of the resultant articles while reducing hinge or bending moments. It is an object of the present invention to provide a strength-enhancing method of twin sheet thermoforming that allows use of conventional twin sheet thermoformers. It is a further object of the invention to produce articles less susceptible to warping.

The present invention concerns an improvement over either single sheet thermoforming with webbing or cross ribs or conventional twin sheet thermoforming. The present invention provides a method for fusing a single sheet of thermoformable material on itself to create a strength-enhancing rib or beam. The sheet thus fused is then fused to a second sheet in a conventional twin sheet thermoforming operation. In the preferred embodiment of the invention, a mold surface structure for forming a major rib is segregated into discrete elements with spaces between individual elements. In forming the sheet of thermoplastic over the series of discrete elements, a major rib is formed along the line of the elements. Between the individual elements, the thermoplastic material will flow together from either side and when fused together form minor or cross rib elements. A single sheet thus fused is then fused in a conventional twin sheet thermoforming operation to another sheet. The second sheet may be conventionally formed or likewise fused upon itself before being fused to the first sheet. The resultant article has greater strength and rigidity for a given amount of thermoformable material used related to the addition of the minor ribs. The method can be practiced using existing thermoforming machinery to produce a stronger structure on a per weight basis of material used and also has reduced bending moments.

From the subsequent detailed description taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
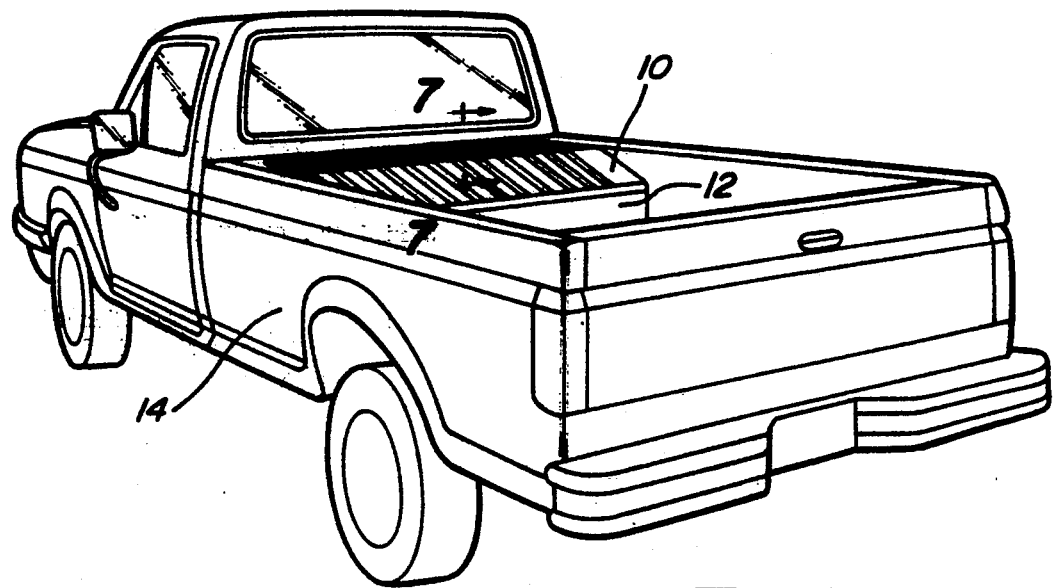
FIG. 1 is a rear perspective view of a vehicle whereon an article made by the method of the present invention is mounted.

FIG. 1 illustrates a product formed by the method of the present invention. The product illustrated in FIG. 1 is a lid 10 for a storage container 12 mounted in a vehicle 17. The illustrated product is shown by way of example. The method of the present invention can be used to form a variety of articles formed by twin sheet thermoforming methods. It is most applicable to those articles where a high degree of rigidity of the article is desired for a given amount of material used.

Figure 2:
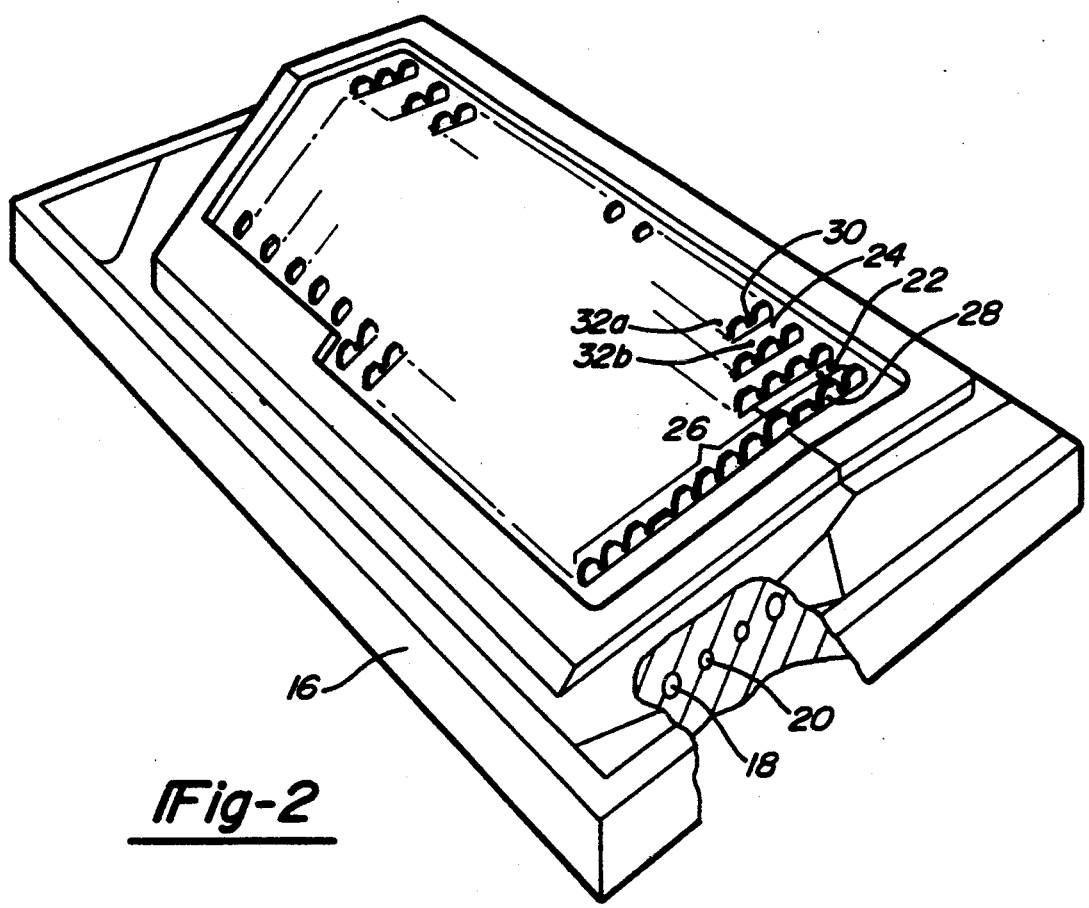
FIG. 2 is a perspective view of a mold for thermoforming a single sheet of material according to the present invention including a partial cross section.

FIG. 2 illustrates one mold 16 of a set of two molds used to produce a product of the type shown in FIG. 1. FIG. 2 illustrates mold 16 preferably made of cast aluminum. Mold 16 is equipped with coolant lines 18 within its interior. The coolant lines are sized and placed within the interior to regulate the temperature of the mold and passage of coolant therethrough in the manner known within the art. The mold is also provided with a network of vacuum lines 20 in its interior. The vacuum lines within the mold communicate with vacuum pores 22 at the surface of the mold to assist in vacuum forming of the thermoplastic material to the mold surface 24. Vacuum lines 20 are sized and placed to communicate with the surface of the mold in a manner well known to practitioners of the art of building molds for conventional twin sheet thermoforming.

The surface structure of the mold contains major rib surface structure 26 to create major ribs in a sheet of thermoformable material vacuum formed to mold surface 24. The major rib surface structure 26 for forming the major rib as shown in FIG. 2 would substantially run the distance of one dimension of the article formed by mold 16. Major rib surface structure 26 for producing the major rib is segmented into discrete elements or tabs 28 which, as a group, form major rib surface structure 26. Tabs 28 are separated by gap 30 which is sized to allow the thermoformable material to flow into gap 30 from both tab sides 32a, 32b of adjacent tabs 28. In use, a sheet of thermoformable material is brought to its thermoforming temperature. In the case of 100% HDPE, this may be in the range of 300°-350° F. The sheet of material is then conformed to mold surface 24 of mold 16 by the application of vacuum through vacuum lines 20 communicating with vacuum pores 22. The vacuum urges the sheet of thermoformable material into conformity with the mold surface 24. The thermoformable material contacts both tab sides 32a, 32b of tabs 28 to form major rib side walls in the resultant article. Thermoformable material flows from one side 32a of adjacent tabs into gap 30 and contacts thermoformable material flowing into gap 30 from the opposite side 32b of the adjacent tabs 28. The single sheet of material fuses upon itself upon contact. The fusing of the thermoformable material in the gap between adjacent tabs forms a minor or cross rib between and bridging the sides of the major rib formed by the major rib surface structure. Such a cross or minor rib acts to stabilize side walls of the major rib of which it bridges, adding an additional degree of stiffness to the major rib itself and the resulting structure.

Figure 3:
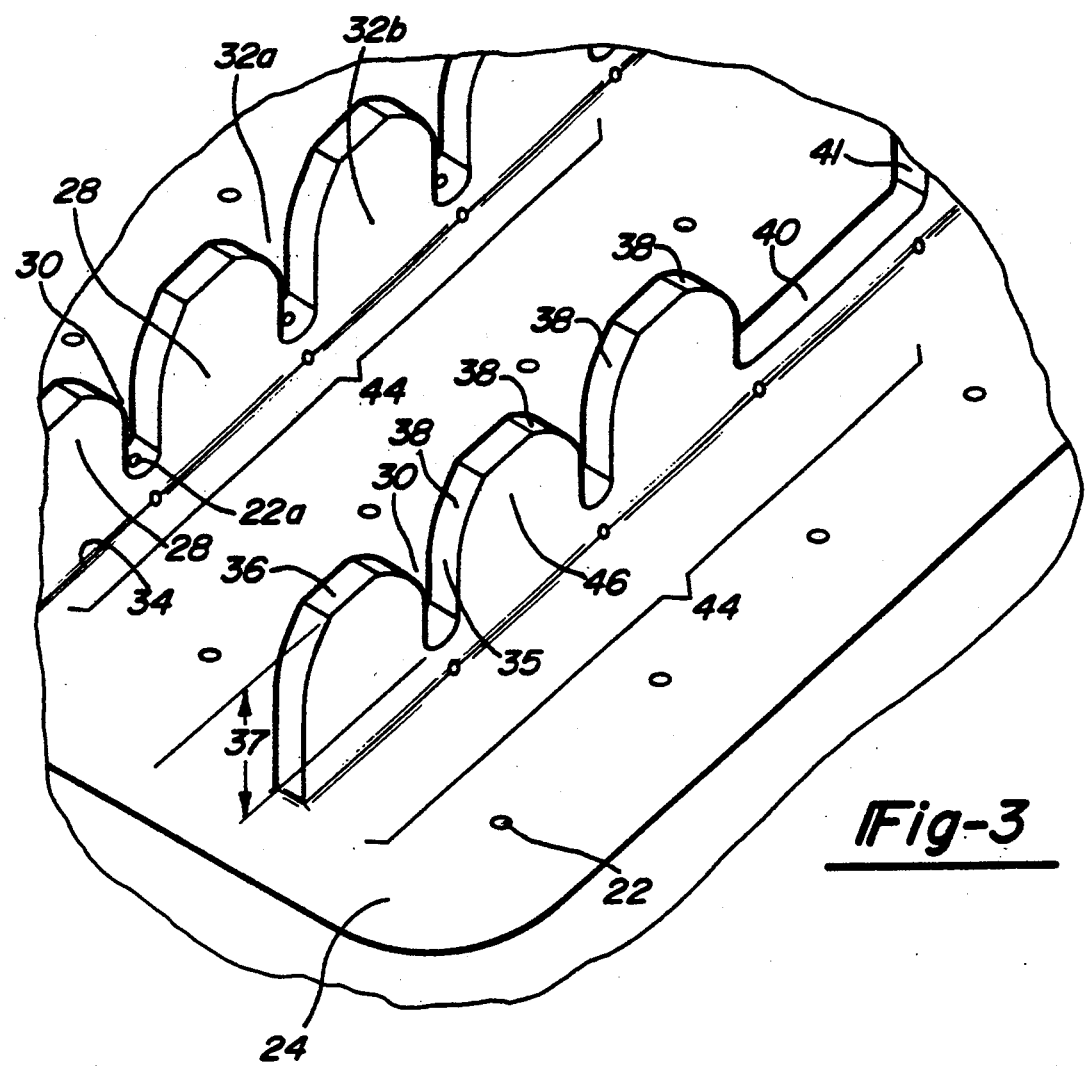
FIG. 3 is an enlarged perspective view of a portion of the surface of the mold shown in FIG. 2.

Turning to FIG. 3, it can be seen that the forming of the thermoformable sheet to mold surface 24 is aided by the location of vacuum pores 22 along the mold surface 24. Vacuum pores 22 communicate with vacuum lines 20 (FIG. 2) for transmitting a vacuum to the surface of the mold. The vacuum transmitted through vacuum pores 22 will cause the sheet of thermoformable material to be drawn toward the vacuum pores and in doing so will conform to the surface of the mold. Vacuum pores are also routinely placed along interior corners 34 of the mold to assist in drawing the thermoformable material into complete contact with the mold surface structure in the interior corners. The sizing and location of the vacuum pores is well known in the art for conventional twin sheet thermoforming molds. In practicing the present invention, cross rib vacuum pores 22a may be added along the mold surface in the area between adjacent tabs 28 to assist in drawing the thermoformable material into gap 30 between adjacent tabs 28 so that the thermoformable material flowing into gap 30 between adjacent tabs from one tab side 32a of the adjacent tabs may contact thermoformable material flowing into gap 30 from opposite tab side 32b of the adjacent tab, thereby forming the minor or cross rib. Cross rib vacuum pores 22a will not be necessary in most applications of the present invention.

The dimensioning of the gap between adjacent tabs is dependent upon the type of material used, its flow characteristics, the amount of vacuum and the height of the tabs. The preferred material for practicing the present invention is HDPE (high density polyethylene) of varying thicknesses. The invention can be practiced with other thermoformable materials, e.g. HDPE, containing varying levels of fillers such as talc. The thickness of the sheets used can vary based upon the amount of material and amount of strength required in the resultant product.

The tabs may have chamfered edges 35 which enhance the ability of the thermoformable material to fuse along the entire gap 30 without excessive thinning of the thermoformable material.

In the preferred embodiment of the invention, a sheet of thermoformable material such as HDPE at approximately 325° F. is placed over mold surface 24. Vacuum is applied through the vacuum pores 22 (and 22a if present). The sheet will first contact mold surface 24 at tab tops 36 and drape over tab shoulders 38. The thermoformable material will bridge between tab shoulders 38 of adjacent tabs 28. Thermoformable material will also bridge between tab rows 44.

Where the space between adjacent tabs is excessive, e.g., where gap 30 is much greater than tab height 37, the thermoformable material bridging between tab shoulders 38 will be pulled downward to conform to tab saddle 40 and tab ends 41 without fusing upon itself.

Where the gap 30 between adjacent tabs 28 is generally less than tab height 37, the thermoformable material bridging between tab shoulders 38 of adjacent tabs 28 will not tend to descend to base 42 between adjacent tabs 28. In such a case, thermoformable material bridging between tab rows 44 will tend to conform to tab side faces 46 on both tab sides 32a, 32b of tab 28. Thermoformable material between adjacent tab side faces 46 adjacent gap 30 will tend to be drawn into gap 30 from both sides 32a, 32b. The thermoformable material flowing into gap 30 from one side 32a will fuse in gap 30 upon contacting material flowing into gap 30 from tab side 32b. The fused material will substantially fill gap 30 and upon cooling will constitute a minor or cross rib between the side of the major rib which are formed over tab side faces 46. The fusing of the thermoformable material usually takes place in a plane defined by gaps 30 along a series of tabs 28.

Figure 4:
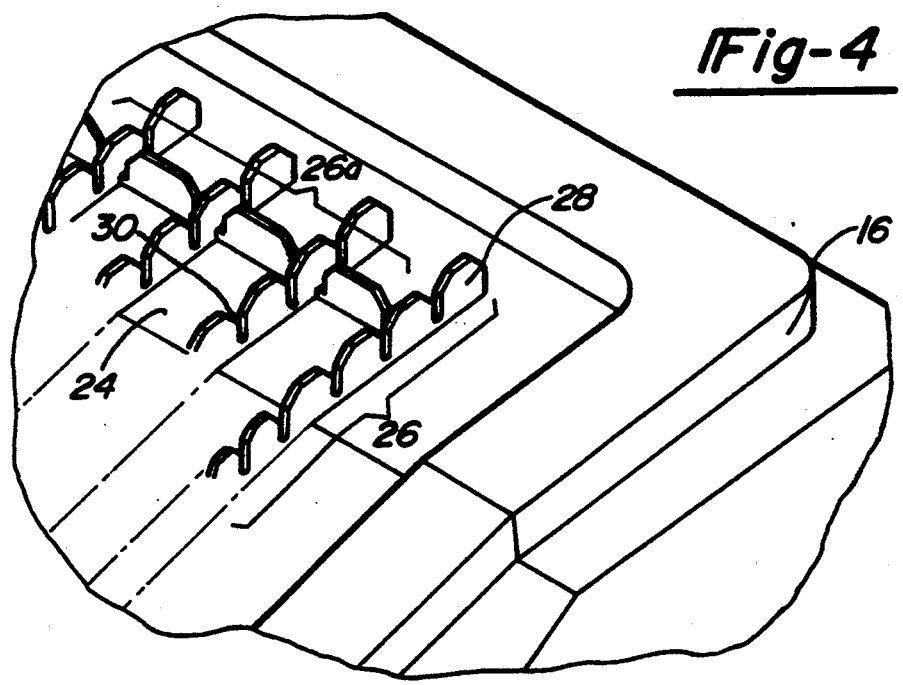
FIG. 4 is a perspective view of a portion of the surface of a mold for an alternate embodiment of the invention.

FIG. 4 illustrates mold 16 for practicing the present invention wherein major rib surface structures 26, 26a of mold surface 24 are located at either oblique or perpendicular angles to one another. Tab 28 extends vertically even on sloped surfaces to allow molded products to be removed from the mold in the machine direction. Tab 28 may also be provided with draft angles to assist in removing the resultant article from mold 16. Mold surface 24 produces a major rib over major rib surface structure 26a which is non-parallel to the rib formed over major rib surface structure 26. Major ribs tend to counteract bending moments from non-parallel major ribs. Mold surface 24 also produces cross ribs within gaps 30 according to the mechanism described with respect to FIG. 3 which further reduce bending moments.

Figure 5:
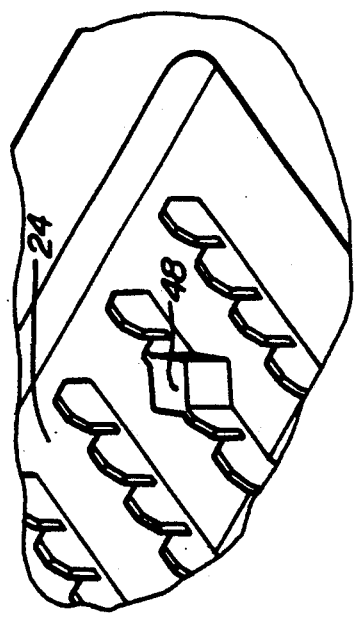
FIG. 5 is a perspective view of a portion of the surface of a mold for an alternate embodiment of the invention.

FIG. 5 shows a mold surface structure having boss-forming monolith 48 on mold surface 24 adapted to produce a boss in the resultant article. Monolith 48 will produce a boss in the thermoformable material formed over the mold. The monolith 48 is placed along major rib surface structure 26 and further serves to prevent propagation of a hinge or bending moment along the article formed by major rib surface structure 26.

Figure 6:
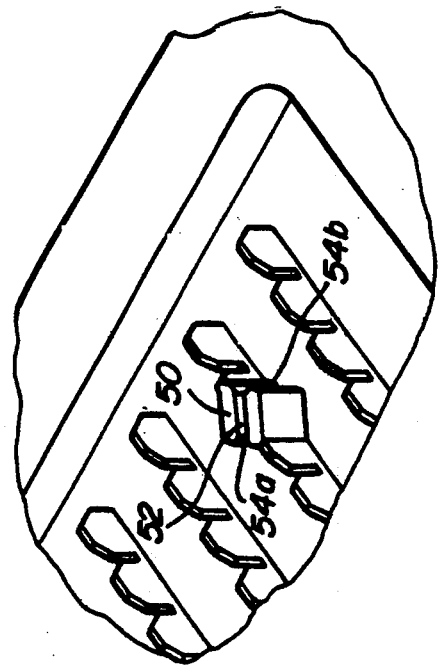
FIG. 6 is a perspective view of a portion of the surface of a mold for an alternate embodiment of the invention.

FIG. 6 shows an alternate embodiment of the invention wherein boss forming surface structure 50 of mold surface 24 is separated by passageway 52. Passageway 52 is sized to encourage the sheet of thermoformable material to flow into the passageway from passageway ends 54a, 54b and fuse within the passageway, creating a cross or minor rib across the resultant boss. Passageway 52 within boss forming surface structure 50 can be placed at any angle with respect to adjacent structures for forming major or minor ribs.

Once a sheet of thermoformable material has been formed to conform to the surface structure of the mold, the sheet is then brought into contact with a second sheet of thermoformable material and fused to the second sheet. The second sheet of thermoformable material may be either formed according to the present invention or conventionally thermoformed. The manner of fusing the first sheet of thermoformable material to the second sheet of thermoformable material is carried out in the conventional manner of twin sheet thermoforming known in the art. With the first and second sheets formed to their respective molds, the sheets are brought into contact with each other. Fusion occurs between the first and second sheets of thermoformable material at the points of contact, especially where the sheets are pressed between respective molds. The fusion between the first and second sheets will generally occur in a different, non-coplanar plane from that in which the cross rib fusion occurs.

Figure 7:
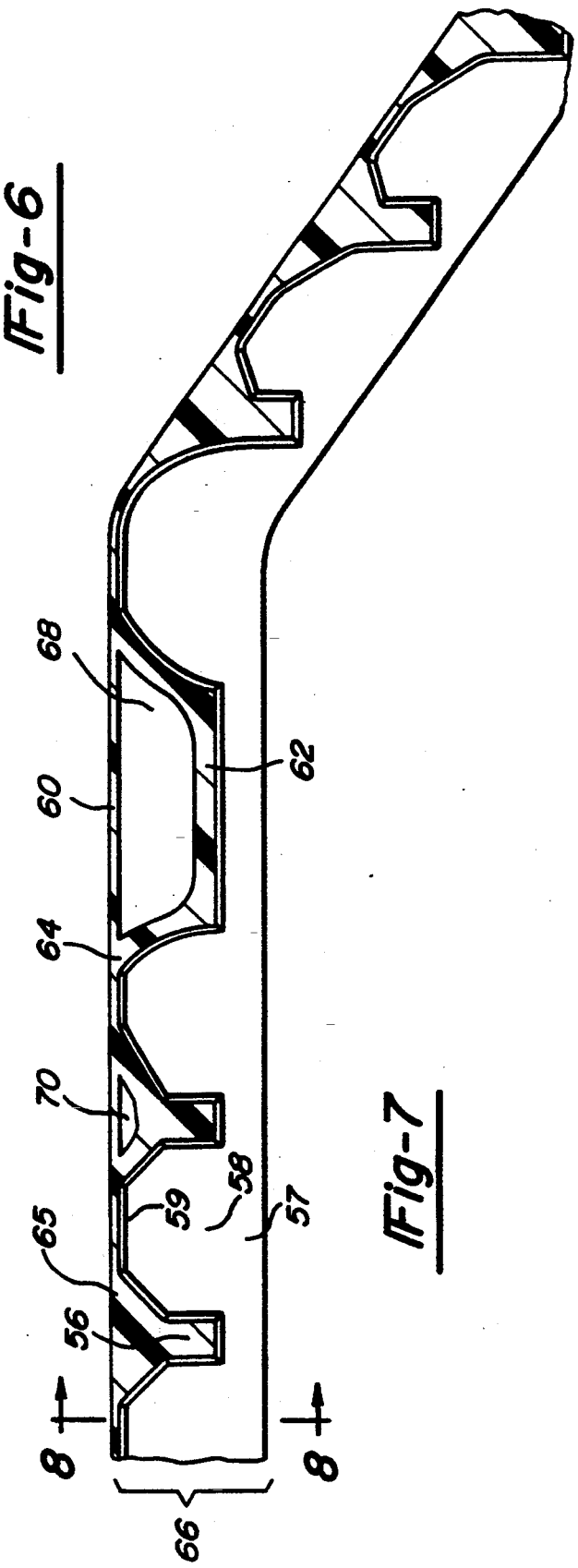
FIG. 7 is a cross sectional view taken along line 7—7 of FIG. 1.

FIG. 7 is a partial cross section of a portion of the article formed by the method of the present invention. Cross rib fused areas 56 are present wherever material from first sheet 62 of thermoformable material migrated between adjacent tabs and fused together. Tab hollows 58 are present in the areas where mold tabs 28 (FIG. 3) were present. Tab hollows appear as pockets in the first sheet (viewed from the mold side) bounded by cross rib fused areas 56, rib side wall 57 and rib floor 59. Second sheet 60 of thermoformable material has been fused to first sheet 62 at contact points 64 such as at rib floor 59 to produce twin sheet thermoformed structure 66. Contact line 65 shows the area of intersection of second sheet 60 to first sheet 62. In areas where first sheet 62 conformed to the mold surface between adjacent tabs without forming cross ribs, major ducts 68 are formed which assist in transferring cooling air through the resultant article after forming. The enhanced cooling provided thereby allows the article to become rigid faster, resulting in reduced manufacturing cycle times. Where the gap between adjacent tabs was narrow enough to produce a cross rib but wide enough to partially draw first sheet 62 below rib floor 59, minor ducts 70 are formed which also assist in transferring cooling air through thermoformed structure 66. The presence of major duct 68 and/or minor duct 70 also serve to interrupt the contact between first sheet 62 and second sheet 60. This reduces the tendency toward warpage by shifts of material in first sheet 62 relative to material in second sheet 60 such as by differential hearing caused by sunlight.

Figure 8:
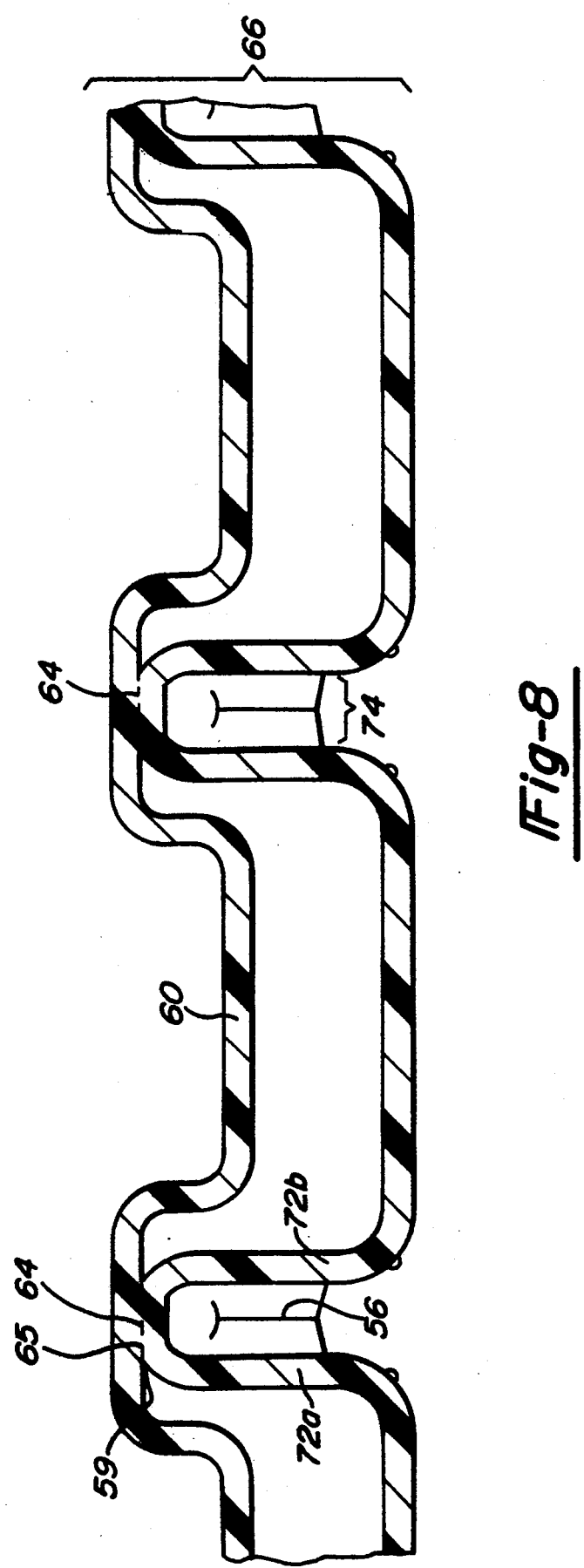
FIG. 8 is a cross section, taken along line 8—8 of FIG. 7, of a portion of an article made by the method of the present invention.

FIG. 8 illustrates the fusion of rib floor 59 to second sheet in twin sheet thermoformed structure 66 at contact points 64. Cross rib fused area 56 stabilizes major rib side walls 72a, 72b along cross rib 74.

EXAMPLE

A lid for a storage box was produced according to the method of the present invention. The lid was approximately 54"×31". The thermoformable material used was 100% HDPE. The lower sheet wherein cross ribs were created was an initial thickness of 120". The upper sheet was an initial thickness of 0.120". The lid was produced in a Brown twin sheet thermoformer which heated the sheets to approximately 325° F. The sheets were formed over their respective molds utilizing approximately 23" Hg. The tabs according to the present invention were approximately 1.0" high, 1.5" wide, 0.5" thick. The gap in adjacent tabs wherein cross ribs were formed was approximately 0.75. Each sheet was then fused together under 70 pounds of pressure. The resultant article was removed from the mold and trimmed.

While the above detailed description describes the preferred embodiment of the present invention, it will be understood that the present invention is susceptible to modification, variation and alteration without deviating from the scope and fair meaning of the subjoined claims.

What is claimed is:

1. A method of producing a load-bearing twin sheet thermoformed structure comprising:
   providing a mold surface having a major rib producing surface comprising at least two tabs separated by a gap;
   thermoforming a first thermoformable sheet over said major rib producing surface so as to produce a rib having first side wall, second side wall and rib floor in said first sheet of thermoformable material;
   fusing said first side wall to said second side wall by vacuum forming said first side wall and said second side wall into contact within said gap;
   fusing said first thermoformable sheet to a second sheet of thermoformable material; and,
   withdrawing said mold surface from said first sheet.

2. The method of claim 1 wherein said fusing said first thermoformed sheet further comprises fusing said rib floor to said second sheet.

3. The method of claim 1 wherein said mold surface further comprises a plurality of major rib producing surfaces each comprising at least two tabs separated by a gap, and said thermoformable sheet further comprises thermoforming said first thermoformable sheet over a plurality of major rib producing surfaces so as to form a plurality of ribs each having first side wall and second side wall and rib floor.

4. The process of claim 3 wherein said fusing of said first side wall to said second side wall further comprises selectively fusing said first side wall to said second side wall of said at least one rib to create a plurality of pockets defined by said first and second side walls, fused portions of said first and second side walls, and said rib floor wherein said pockets are arranged along said rib.

5. The method of claim 1 further comprising:
thermoforming duct means for passage of coolant within said structure during manufacture.

* * * * *

UNITED STATES PATENT AND TRADEMARK OFFICE
CERTIFICATE OF CORRECTION

PATENT NO. : 5,407,632
DATED : April 18, 1995
INVENTOR(S) : James P. Constantino and Raymond H. Gosnell It is certified that error appears in the above-indentified patent and that said Letters Patent is hereby corrected as shown below:

In the TITLE [54] on cover page, line 1, "THERMFORMED" should be —THERMOFORMED—

Col. 1, line 1, "THERMFORMED" should be --THERMOFORMED--

Col. 1, line 6, "077/877,996" should be —07/877,996—

Col. 6, line 27, "120"" should be --.120"--

Signed and Sealed this

Nineteenth Day of September, 1995

Attest:

BRUCE LEHMAN

Attesting Officer    Commissioner of Patents and Trademarks